United States Patent [19]
Federico et al.

[11] 4,440,985
[45] Apr. 3, 1984

[54] APPARATUS FOR DETERMINING THE LOCATION OF FAULTS IN A TRANSMISSION LINE

[75] Inventors: Joseph Federico, Berkeley Heights; Sigurd G. Waaben, Princeton, both of N.J.

[73] Assignee: Bell Telephone Laboratories, Incorporated, Murray Hill, N.J.

[21] Appl. No.: 452,942

[22] Filed: Dec. 27, 1982

Related U.S. Application Data

[63] Continuation of Ser. No. 275,903, Jun. 22, 1981, abandoned.

[51] Int. Cl.³ .............................................. H04B 3/46
[52] U.S. Cl. .................................. 179/175.3 F; 324/52
[58] Field of Search ................ 179/175.3 F, 175.3 R, 179/2 A, 78; 333/236; 324/52

[56] References Cited
U.S. PATENT DOCUMENTS 3,636,280  1/1972  Wetzel ........................ 179/175.3 R
3,843,848  10/1974  Cox ............................. 179/175.3 R
4,054,759  10/1977  McGrath et al. ............ 179/175.3 R Primary Examiner—Stafford D. Schreyer
Attorney, Agent, or Firm—R. O. Nimtz; J. T. Peoples

[57] ABSTRACT

A toroidal, saturable core reactor (14) is connected in series with the conductors (11,19 and 13,21) of a transmission line. A termination network (16) is connected across the transmission line conductors (19,21). In response to an a.c. test signal transmitted from a generator (48) on one of the conductors (11), a series of voltage spikes are induced at the reactor (14) and superimposed on the a.c. test signal. The superimposed a.c. test signal is returned through the termination network (16) and the other line conductor (13) to a current detector (50) for detecting the spikes. A d.c. signal is then applied along with the a.c. signal. If there is a fault beyond the reactor (14), the spikes will be displaced from their expected positions. If there is a fault before reactor (14), the spikes will not be displaced. For ease in signal discrimination against noise, the d.c. signal is modulated.

14 Claims, 9 Drawing Figures

| FIG. 7 | FIG. 8 |

APPARATUS FOR DETERMINING THE LOCATION OF FAULTS IN A TRANSMISSION LINE

This is a continuation of application Ser. No. 275,903, filed June 22, 1981, abandoned.

BACKGROUND OF THE INVENTION

1. Field of the Invention

This invention relates to transmission line fault location systems and, in particular, to a method and an apparatus for determining on which side of the apparatus the fault is located.

2. Description of the Prior Art

The present invention can best be understood by reference to its application in a particular industry. In telephone subscriber loops, many subscribers provide their own terminal equipment and install their own wiring inside of their premises. A problem then arises of being able to isolate faults occurring in the telephone subscriber loop as being located within the subscriber's premises, in the inside wiring or the terminal equipment, or being located in that section of the subscriber loop outside the subscriber's premises which is owned by the telephone company. Furthermore, accurate fault location is also useful to a telephone company for dispatching the appropriate repairperson to correct the fault. Accordingly, it is necessary to provide an apparatus at the interface between the loop sections. Similar problems arise in other transmission systems where it is desirable to locate a fault in one or the other section of the transmission line, e.g., aerial or underground sections, within or outside of buildings, diversely owned sections, and so forth.

SUMMARY OF THE INVENTION

In accordance with the illustrative embodiment of the present invention, a nonlinear circuit such as a saturable core reactor is connected permanently in series with the conductors of a transmission line. A termination network is connected permanently, in shunt with the reactor, across the conductors of the transmission line.

When an alternating current test signal is transmitted from a testing source on one conductor of the transmission line, voltage spikes will be induced in the reactor windings when the alternating magnetic drive in the reactor exceeds the switching threshold of the magnetic core. These spikes are superimposed on the alternating current test signal and will be returned by the termination network through the other conductor in the transmission line to the testing source.

When a direct current signal is transmitted simultaneously with the alternating current test signal from the testing source, the bias level of the alternating current test signal will be changed, thereby causing the displacement of the voltage spikes induced in the reactor windings.

If the superimposed signal detected at the testing source does not show a displacement of the spikes, it can be concluded that a fault exists ahead of the reactor reducing the direct current signal which reaches the reactor. If the superimposed signal received at the testing source shows a displacement of the spikes, it can be concluded that a fault exists beyond the reactor.

The advantages of this invention are many: only passive components are used in the transmission line apparatus; the transmission path is not interrupted; the insertion loss is very low; low cost immunity to lightning surges is provided; high reliability of component parts is achieved; and no ground connection is necessary at the reactor or termination network.

The detectable faults are direct current shorts, open circuits, direct current leaks, and alternating current power line shorts.

DETAILED DESCRIPTION

Figure 1:
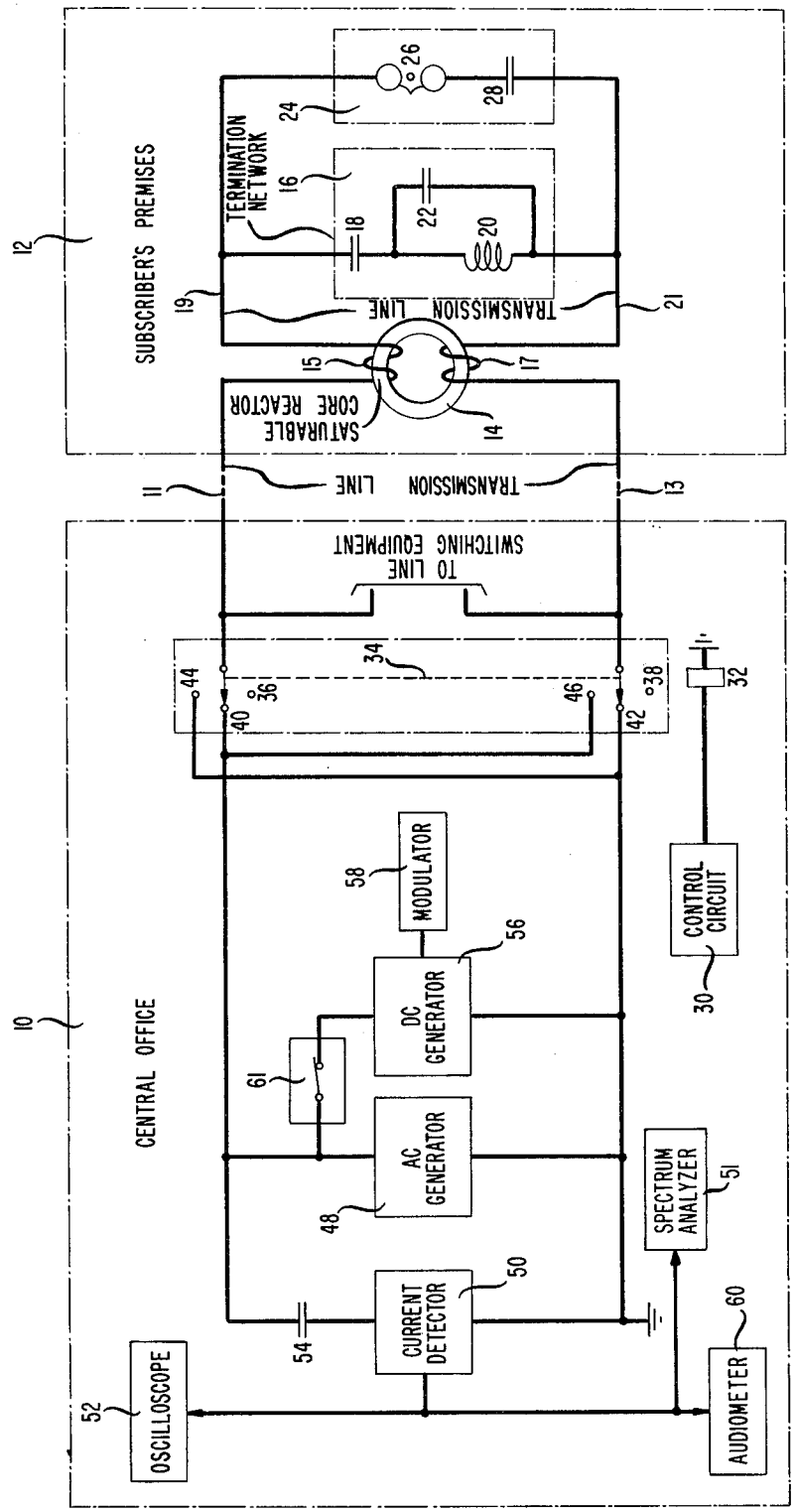
FIG. 1 is a block diagram showing the fault location apparatus.

Referring to FIG. 1 there is shown a transmission line, such as a telephone subscriber loop, comprising conductors 11 and 13. The subscriber loop 11, 13 is shown connecting a telephone central office 10 with a subscriber's premises 12.

At the subscriber's premises 12, there is shown a toroidal, saturable core reactor 14 having two windings 15,17 connected with the subscriber loop conductors 11,13, respectively. Also shown connected to the toroidal windings 15,17 are the loop conductors 19,21, respectively, of the inside wiring. Connected across the conductors 19,21 is a termination network 16 comprising in series a capacitor 18 and an inductor 20. A capacitor 22 is connected in parallel with inductor 20. Terminal equipment, such as a telephone set 24, in the ON-hook or idle state, comprising in series a set of ringers 26 and a capacitor 28 is shown connected across the conductors 19 and 21. When the subscriber owns only the telephone set 24, reactor 14 may be placed adjacent to or within the telephone set 24. For all other cases, it is preferable to locate the reactor 14 at the entrance of loop 11,13 to the subscriber's premises, usually adjacent to the protector blocks (not shown).

Thus, it can be seen that reactor winding 15, connected at one end with conductor 11 and at the other with conductor 19, provides continuous and permanent connection between the central office 10 and the telephone set 24. Likewise, conductor 13, reactor winding 17 and conductor 21 provide a continuous and permanent connection between the central office 10 and the telephone set 24. The conductive paths 11,15,19 and 13,17,21 are sometimes referred to as the tip and ring conductors, respectively.

Referring to central office 10, there is shown a control circuit 30 for controlling a relay 32. When operated relay 32 moves the switch 34 successively from terminals 36,38 to 40,42 and 44,46. Under normal operation, switch 34 rests on terminals 36,38 and the subscriber loop 11,13 is terminated on switching equipment (not shown).

During normal telephone operation, usually a minimum loop current of about 20 mA, flows through the telephone subscriber loop 11,13. Such a loop current will saturate reactor 14, making reactor 14 essentially transparent to impressed signals such as voice signals. Thus, under normal operations, reactor 14 and termination network 16 will nt affect telecommunications.

When the subscriber loop is reported to be faulty, it becomes necessary to determine whether the fault is located on the customer premises side of reactor 14 or on the central office side of reactor 14 so that an appropriate repair person may be assigned to correct the fault. Alternatively, if the subscriber owns the section of the subscriber loop beyond the reactor 14 and termination network 16, the aforesaid fault location fixes the responsibility for correcting the fault.

Accordingly, when a fault is reported, control circuit 30 is operated to energize relay 32, thereby moving switch 34 to the terminals 40,42. Alternating current (a.c.) generator 48 applies an a.c. test signal on tip conductor 11, simultaneously grounding ring conductor 13. The a.c. test signal flows through reactor winding 15, thereby causing the magnetic flux induced in the saturable core reactor 14 to be switched periodically. The switching of the magnetic flux induces a voltage in the reactor winding 15 which appears as a spike superimposed on the a.c. test signal. The superimposed a.c. test signal is returned through the termination network 16, reactor winding 17, and ring conductor 13 to the current detector 50 at central office 10.

Whereas an a.c. test signal has been used in the preferred embodiment of this invention, it is possible to use discrete pulses such as trapezoidal pulses.

Furthermore, in place of the reactor 14, other nonlinear components may be used. One such device (not shown) would include a diode and a resistor connected in parallel and the device inserted in series with each loop conductor.

Figure 2:
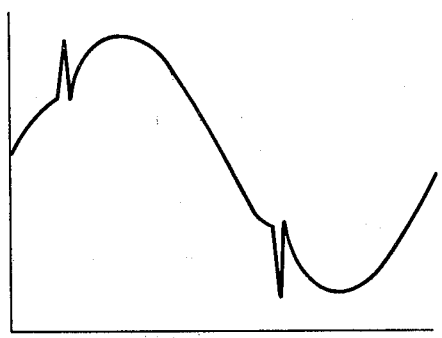
FIG. 2 shows the superimposed signal received at the testing source.

When an oscilloscope 52 is connected to the current detector 50, the aforesaid superimpoed a.c. test signal will appear as shown in FIG. 2.

Figure 3:
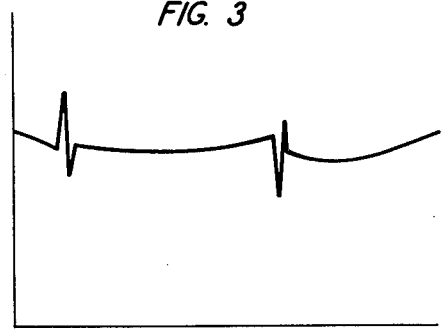
FIG. 3 shows the voltage spikes after the alternating current signal has been removed.

In order to select the spike superimposed on the a.c. test signal and discriminate against noise, a capacitor 54 is connected in series with the current detector 50 as shown in FIG. 1. Furthermore, if it is desirable to view the aforesaid spikes on a horizontal line as shown in FIG. 3, another a.c. signal, from a source not shown, of substantially the same frequency and amplitude of the aforesaid a.c. test signal but having an opposite phase (i.e., 180 degrees) thereto is applied along with the aforesaid a.c. testing signal to a summing amplifier (not shown) located immediately before the oscilloscope 52 in FIG. 1.

Returning to FIG. 1, a direct current (d.c.) signal from a d.c. generator 56 is applied by way of switch 61 along with the aforesaid a.c. test signal to the tip conductor 11. D.C. generator 56 is shown connected in parallel to a.c. generator 48; they can also be connected in series. The d.c. signal will change the bias level of the a.c. test signal and thus change the switching time of the magnetic flux in reactor 14. The effect of the switching time change is to displace the superimposed spikes on the a.c. test signal. The displacement of the spikes will be detected by the current detector 50 and the oscilloscope 52 at central office 10.

If there were a fault between central office 10 and reactor 14 in loop conductors 11,13, such as a leak to ground from one of the conductors, the d.c. signal applied to tip conductor 11 at central office 10 will be leaked to ground at the fault and will not reach the reactor 14. Consequently, the a.c. test signal will not be biased and the spikes will not be displaced.

On the other hand, if the aforesaid leak to ground occurred beyond the reactor 14, i.e., in the loop conductors 19,21, the d.c. signal applied to the tip conductor 11 will reach the reactor 14 causing the spikes to be displaced as described hereinabove.

The leak to ground fault, thus, is located as being either before the reactor 14 or beyond it. Likewise, d.c. shorts and a.c. power line crosses (i.e., shorts) can be located using the aforesaid d.c. signal and detecting the resulting displacement of spikes.

If there is an open circuit in the subscriber loop 11,13 before the reactor 14, the spikes superimposed on the a.c. test signal cannot be returned to the central office 10 and no spikes will be detected at current detector 50. If the open circuit, however, is beyond the reactor 14, the spikes will be detected at current detector 50. To confirm that the open is beyond the reactor 14, a 20 Hz signal, from a ringing generator (not shown), for ringing the telephone set 24 is applied to tip conductor 11 at the central office 10. Because there is an open circuit beyond reactor 14, the aforesaid 20 Hz ringing signal will not be detected on ring conductor 13 at the central office 10.

Figure 4:
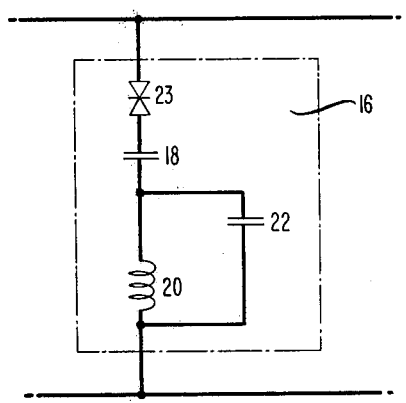
FIG. 4 is an alternate termination network that may be used in FIG. 1.
Figure 5:
FIG. 5 shows the superimposed signal received at the testing source when the termination network of FIG. 4 is used in FIG. 1.

There are other variations to the termination network 16 of FIG. 1 which may be used to aid in detecting open lines. One such variation is shown in FIG. 4. The termination network in FIG. 4 differs from that in FIG. 1 by the addition of a varistor 23 in series with capacitor 18. Varistor 23 serves to block normally present loop signals such as voice currents but permits the flow of the higher voltage a.c. test signal. The use of varistor 23 produces an extra spike, in addition to the switching spike, superimposed on the a.c. test signal as shown in FIG. 5.

As stated hereinabove, when a fault is located beyond the reactor 14, the spikes superimposed on the a.c. test signal will be displaced. The spikes may be visualized more easily by modulating the d.c. signal by an a.c. signal, such as a 1 Hz signal, from a modulator 58 connected to the d.c. generator 56 in FIG. 1. The spikes will be seen to be moving or varying across the screen of oscilloscope 52. The spikes can also be heard by amplifying the spiked of superimposed a.c. test signal and feeding the amplified signal (amplifier not shown) to a speaker, audiometer, or telephone 60. The spikes may also be detected by the method of synchronous detection, a method used with radar systems.

Figure 6:
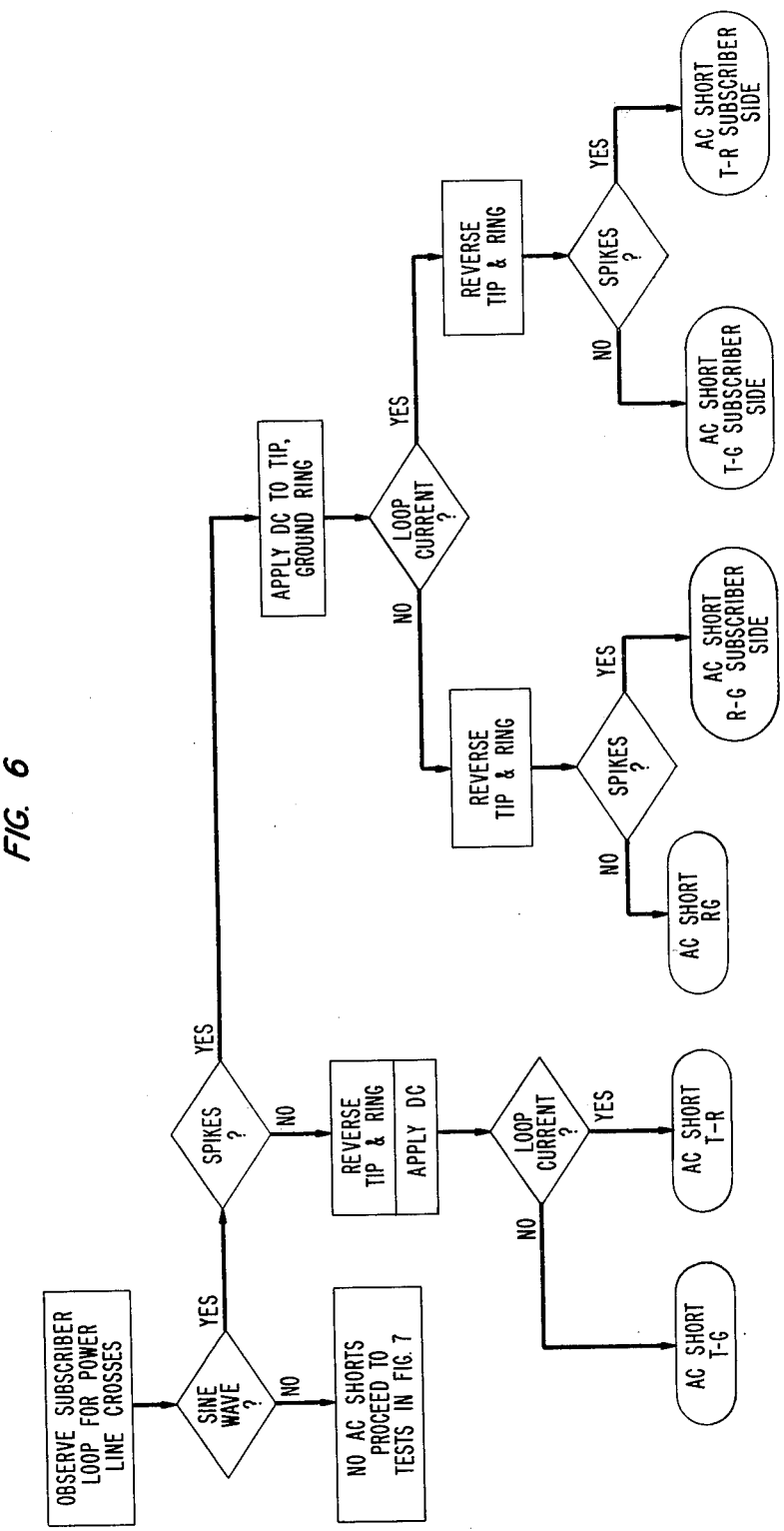
FIG. 6 shows a flow chart for a sequence of tests necessary to detect power line crosses.

As stated hereinbove, it is possible to locate a fault in a transmission line 11,13 as being located either before a reactor 14 or beyond the reactor 14. It is also necessary to determine with particularity which of the conductors, or both, are faulty. Referring to FIG. 6, there is shown a sequence of tests for determining a.c. power line crosses. During the sequence of tests, it is necessary to reverse the application of the test signals from the tip conductor 11 to the ring conductor 13; likewise, the ground connection is removed from the ring conductor 13 and applied to the tip conductor 11. This operation is achieved by triggering control circuit 30 to operate relay 32 thereby causing switch 34 to move from terminals 40,42 to terminals 44,46. If a subsequent step in the sequence of tests call for reversing tip and ring, switch 34 is moved back to terminals 44,46 from terminals 40,42.

Figure 7:
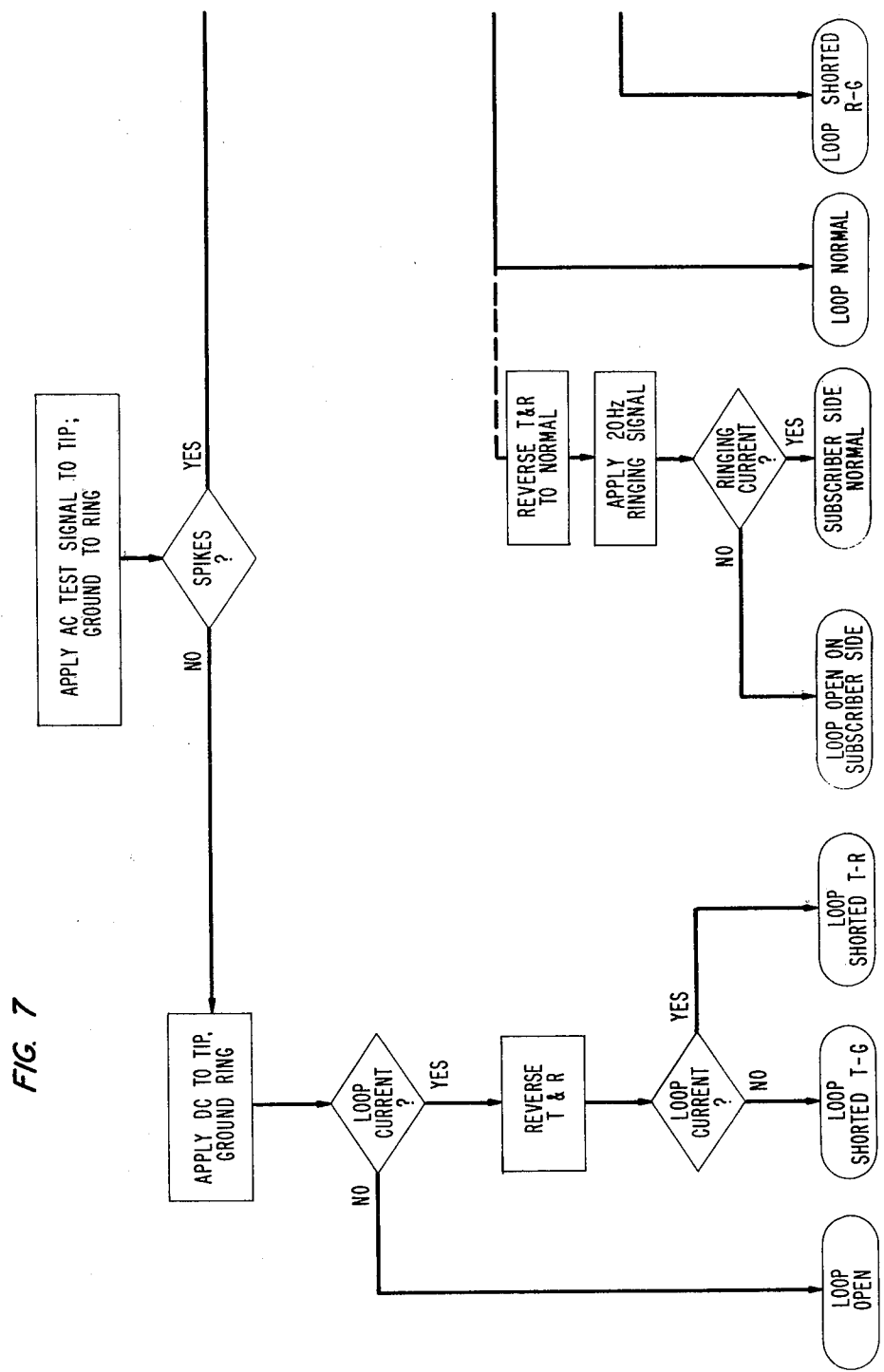
FIGS. 7, 8 and 9 show a flow chart for a sequence of tests necessary to detect shorts, leaks and opens.
Figure 9:
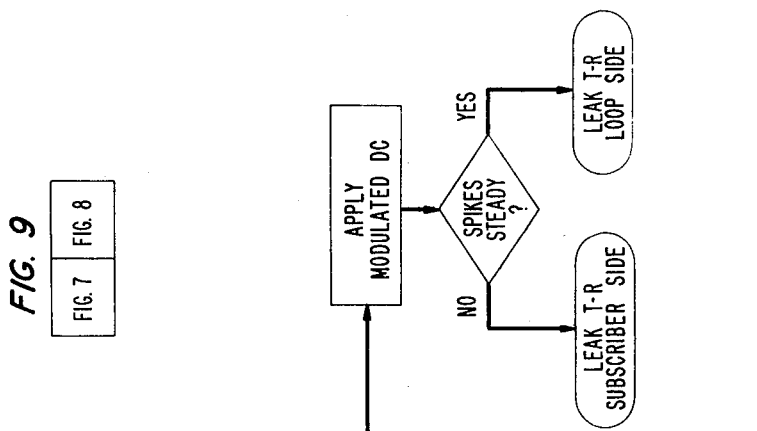
Figure 8:
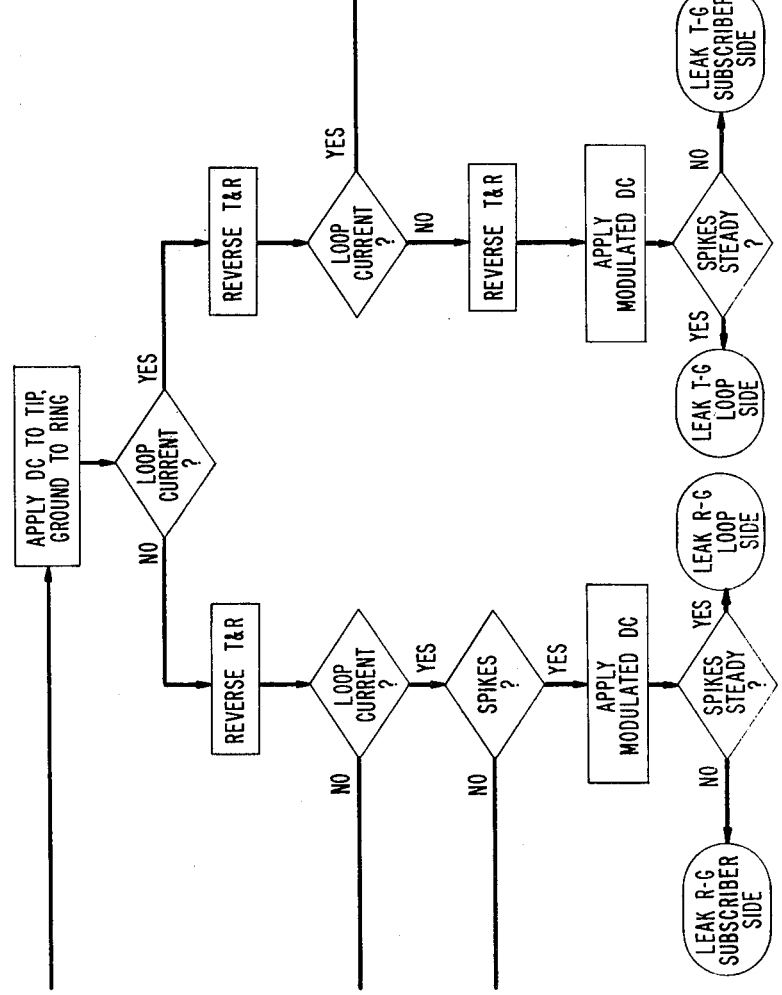

Referring to FIGS. 7, 8 and 9, there is shown a sequence of tests for determining whether a fault is located before reactor 14 or after reactor 14. Furthermore, d.c. leaks and d.c. shorts from tip conductor 11 or 19 to ground, from ring conductor 13 or 21 to ground, from tip conductor 11 to ring conductor 13 or from tip conductor 19 to ring conductor 21 can be detected. Additionally, it is shown how an open in conductors 11,13,19, or 21 is detected.

Referring to FIG. 1, it is possible to use only reactor 14, without termination network 16, to detect conduction paths such as leaks, shorts and a.c. power line crosses. The aforesaid faults provide a path from one conductor to the other, or from one conductor to ground. Consequently, the aforesaid test signals applied to the transmission line 11,3 on one of the conductors 11 or 13 will be returned to current detector 50 through the fault and either the remaining conductor or ground. The relevant tests are shown in FIGS. 6, 7, 8 and 9, described briefly hereinabove.

In telephone subscriber loops, protector blocks (not shown) are normally connected between each loop conductor and ground at a subscriber's premises for protection against spurious voltages. It is possible to use these protector blocks instead of the termination network 16 shown in FIG. 1. The test signals, however, must necessarily be of a sufficiently high value to obtain conduction through the protector blocks.

Whereas a single reactor 14 is shown in FIG. 1, it is equally possible to use a plurality of reactors (not shown)—one in series with each conductor of the transmission line.

The method described hereinabove shows how to locate faults in a transmission line as being on one side or the other of an apparatus connected in series therewith. By extension, it is possible to determine the location of faults in a transmission line by section. A plurality of apparatus, similar to rector 14 in FIG. 1, are located along a transmission line. Each reactor, if reactors are used, would have a unique threhsold. In response to an a.c. test signal, each reactor would cause a spike to be superimposed on the a.c. test signal. The spikes would be spread out along the a.c. test signal, i.e., each spike will be separated from the others in time. The method of detecting faults will be as disclosed hereinabove.

What is claimed is:

1. A method for determining if a fault occurs in a transmission line having a nonlinear device (16) connected in cascade with said line, said method characterized by the steps of
    applying a test signal to said line at a test location to generate a returned signal, and
    indicating that said fault occurs before said device if said returned signal is a distortionless version of said test signal.

2. A method for determining if a fault in a transmission line is located after circuitry (14,16) connected in cascade with said line, said circuitry comprising a nonlinear device having an operating characteristic adjustable with an offset signal, said method characterized by the steps of
    applying a test signal to said line before said circuitry to generate a first returned signal,
    applying said test signal simultaneously with said offset signal before said circuitry to generate a second returned signal, and
    if said second returned signal contains frequency components not contained in said first returned signal, indicating that said fault occurs after said circuitry.

3. A method for determining if a fault in a transmission line is located after circuitry (14,16) connected in cascade with said line, said circuitry comprising a nonlinear device having an operating characteristic adjustable with an offset signal, said method characterized by the steps of
    applying a test signal simultaneously with said offset signal to said line before said circuitry to generate a returned signal, and
    if said returned signal contains frequency components not contained on said line during application of only said test signal, indicating that said fault occurs after said circuitry.

4. A method for determining whether a fault in a transmission line is located before or after circuitry (14,16) connected in cascade with said line, said circuitry comprising a nonlinear device having an operating characteristic adjustable with an offset signal, said method characterized by the steps of
    (1) applying a test signal to said line before said circuitry to generate a returned signal,
    (2) determining if said returned signal contains any frequency components not contained in said test signal,
    (3) if said components are detected, proceeding to step (4); otherwise proceeding to step (7),
    (4) applying said offset signal simultaneously with said test signal to said line to generate a reflected signal,
    (5) determining if said reflected signal contains other frequency components not contained in said test signal and said offset signal,
    (6) if said other components are detected, indicating that said fault is located after said circuitry and stopping, and
    (7) indicating that said fault is located before said circuitry and stopping.

5. A method for locating faults in a transmission line comprising the steps of
    generating a test signal and an offset signal,
    providing circuitry comprising a nonlinear device having an operating characteristic determined by said offset signal,
    connecting said circuitry in cascade with said line,
    applying said test signal to said line at a location on one side of said circuitry to generate a first returned signal,
    applying said test signal simultaneously with said offset signal at said location to generate a second returned signal,
    comparing the frequency components of both said first and second returned signals, and
    if said components differ, indicating that at least one of said faults is located on the other side of said circuitry.

6. The method as recited in claim 5 wherein the step of generating a test signal and an offset signal includes the steps of
    providing an alternating current signal as said test signal, and
    providing a direct current signal as said offset signal.

7. The method as recited in claim 5 wherein the step of generating a test signal and an offset signal includes the steps of
    providing as said test signal an alternating current signal having a first frequency, and providing as said offset signal a direct current signal modulated by another alternating current signal having a second frequency, said second frequency being less than said first frequency.

8. A method for locating faults in a transmission line comprising the steps of
providing circuitry comprising a saturable core reactor and connecting said reactor in series with said line,
providing a network and connecting said network across said line on one side of said circuitry,
applying an AC signal to said line at a location on the other side of said circuitry to generate a first returned signal,
applying said AC signal simultaneously with a DC signal at said location to generate a second returned signal,
detecting and comparing the frequency components of both said first and second returned signals, and
if the number of said components differ, indicating that at least one of said faults is located on said one side of said circuitry.

9. A method for determining the location of a fault in a cascade arrangement of a transmission line and saturable core reactor, said fault being located on one side or the other of said reactor, said method comprising the steps of
applying an alternating current signal to said transmission line on said one side of said reactor and detecting any spikes induced by said reactor in response to said alternating current signal by using detecting means, and
applying a direct current signal simultaneously with said alternating current signal and detecting any displacement of said spikes using said detecting means, thereby determining
(a) if said spikes are displaced, that said fault is located on said other side of said reactor, and
(b) if said spikes are not detected or displaced, that said fault is located on said one side of said reactor.

10. In a transmission line comprising a cascade of transmission line sections and a plurality of saturable core reactors each of said reactors being located at the junction of pairs of said sections, a method for determining the section in which a fault is located characterized by the steps of
applying an alternating current signal to said transmission line from a test source and detecting any spikes induced in said reactors in response to said alternating current signal, and
applying a direct current signal with said alternating current signal and detecting any displacement of said spikes, thereby determining the section in which said fault is located.

11. Circuitry for locating a fault on a transmission line comprising
means for generating a test signal having first frequency components,
a nonlinear device connected in cascade with said line,
means for applying said test signal to said line at a location before said device to generate a returned signal on said line at said location having second frequency components, and
fault location means, responsive to said test signal and said returnd signal, for indicating that said fault is before said device whenever said second components substantially match said first components.

12. Circuitry for locating a fault on a transmission line comprising
means for generating a test signal having predetermined frequency components,
a nonlinear device connected in cascade with said line,
means for applying said test signal to said line at a location before said device to generate a returned signal at said location,
frequency analyzer means,
means for detecting and connecting said returned signal to said analyzer means to obtain comparison frequency components, and
fault location means, responsive to said predetermined components and said comparison components, having an operational mode for indicating that said fault is before said device whenever said comparison components substantially match said predetermined components.

13. Circuitry as recited in claim 12 further comprising
means for producing an offset signal, said nonlinear device having an operating characteristic controlled by said offset signal, and
means, operating alternately with said means for applying whenever said comparison components differ from said predetermined components, for energizing said line at said location with said offset signal superimposed on said test signal to produce a reflected signal,
means for receiving and coupling said reflected signal to said frequency analyzer means to obtain reflection frequency components,
said fault location means further responsive to said reflection components and having another operational mode for indicating that said fault is before said device whenever said reflection components substantially equal said comparison components and, otherwise, that said fault is after said device.

14. Circuitry for locating faults in a transmission line as being located on one side or the other of a nonlinear network arranged in cascade with said line, said network
characterized by
means for generating spikes in response to a first signal applied to said line from a test source and for superimposing said spikes on said first signal, and
means for displacing said spikes in response to a second signal applied to said transmission line with said first signal,
said circuitry comprising means for detecting said displaced spikes.

* * * * *

UNITED STATES PATENT AND TRADEMARK OFFICE
CERTIFICATE OF CORRECTION

PATENT NO. : 4,440,985
DATED : April 3, 1984
INVENTOR(S) : Joseph Federico and Sigurd G. Waaben It is certified that error appears in the above—identified patent and that said Letters Patent is hereby corrected as shown below:

Column 2, line 29, "11, 13" should read --11,13--. Column 3, line 5, "nt" should read --not--; line 38, "superimpoed" should read --superimposed--. Column 4, line 45, "of" should read --or--. Column 5, line 14, "11,3" should read --11,13--; line 36, "rector" should read --reactor--.

Signed and Sealed this

Eighteenth Day of September 1984

[SEAL]

Attest:

GERALD J. MOSSINGHOFF

Attesting Officer

Commissioner of Patents and Trademarks